United States Patent [19]
Popp et al.

[11] Patent Number: 5,207,302

[45] Date of Patent: May 4, 1993

[54] SHOCK ABSORBING STRUCTURE FOR A STRETCHED CABLE, PARTICULARLY FOR CABLE RETAINING ROCK WALL FENCES, ROCK FILL RETAINING GRIDS OR FENCES, SNOW FENCES, AND THE LIKE

[75] Inventors: Xaver Popp, Lömmenschwil; Theo Loepfe, Häggenschwil, both of Switzerland

[73] Assignee: Fatzer AG, Romanshorn, Switzerland

[21] Appl. No.: 807,986

[22] Filed: Dec. 16, 1991

[30] Foreign Application Priority Data

Dec. 31, 1990 [CH] Switzerland ............... 04140/90

[51] Int. Cl.⁵ .................... F16F 7/12; E01F 7/02; B64F 1/02
[52] U.S. Cl. .................... 188/372; 188/381; 256/12.5; 244/110 C
[58] Field of Search .............. 188/371–374, 188/381; 267/155; 74/502.5; 256/12.5, 13.1, 39; 403/206, 209, 215; 244/110 C

[56] References Cited

U.S. PATENT DOCUMENTS

| 3,553,345 | 1/1971 | Edwards | 188/381 |
| 3,917,030 | 11/1975 | Morley et al. | 188/374 |
| 4,427,033 | 1/1984 | Ege | 74/502.5 |

FOREIGN PATENT DOCUMENTS

| 610631 | 4/1979 | Switzerland . | |
| 659299 | 1/1987 | Switzerland . | |
| 8700878 | 2/1987 | World Int. Prop. O. | 256/12.5 |

Primary Examiner—Robert J. Oberleitner
Assistant Examiner—Chris Schwartz
Attorney, Agent, or Firm—Frishauf, Holtz, Goodman & Woodward

[57] ABSTRACT

To permit absorption of sudden impacts or shock overloads, or gradual overloads, on a cable stretched to retain stones, rocks or snow masses, for example in road or railway cuts, a tube is bent to form an open loop, the end portions of which are held together by a clamp so that the end portions are frictionally engaged against each other, and the cable is threaded through the tube. Upon overload, the tube can plastically deform, thereby reducing the diameter of the loop or ring formed thereby, and accept overloads without overloading or unduly stressing the cable.

18 Claims, 1 Drawing Sheet

SHOCK ABSORBING STRUCTURE FOR A STRETCHED CABLE, PARTICULARLY FOR CABLE RETAINING ROCK WALL FENCES, ROCK FILL RETAINING GRIDS OR FENCES, SNOW FENCES, AND THE LIKE

FIELD OF THE INVENTION

The present invention relates to a shock absorber or impact damping device for association with a tension cable, in which the cable is used, for example, to support retaining fences or mesh structures to prevent rock slides or falling rocks, snow or avalanches or the like, from falling on a utilization surface, for example a roadway, railway line or the like, and which are capable of accepting overloads, which may be sudden overloads due to loosening of rocks or snow masses.

BACKGROUND

Utilizing tensioned wire ropes or cables, or nets, grids, or fencing made of such cables or reinforced by cables is not suitable in many installations since the capability to accept dynamic stresses is limited. It is not possible to extend the diameter of such retaining cables or reinforcing cables to such an extent that they are capable of absorbing all possible arising forces, due to limitations based on transportation and cost for protective works adjacent roads, railway cuts or the like, for example.

The referenced Swiss Patent 610,631, Bolliger et al, describes a connection for tensioned wire cables, in which a loop is introduced into the cable which is clamped to the cable by clamps which are capable of permitting slipping of the loop portions. If the tension on the cable, rope, typically wire rope, or other tension element exceeds a certain level, the loop portions can slide against each other, and absorb energy applied on the cable. The slippage of the cable, however, is subject to wide variations with a given applied force. Rust, changes in temperature, composition of materials and the like, all affect the capability to absorb overloads.

The referenced Swiss Patent 659,299, assigned to the assignee of the present application, teaches another way; in which a ring-shaped element is coupled to two cable portions which, upon overload, can stretch. The arrangement provides the desired capability to accept overload, however is expensive to install and requires additional cable terminations and connections to the ring element.

THE INVENTION

It is an object to provide a shock absorber and overload absorber for cables, particularly for cables used in combination with retaining fences to prevent rock falls, rock slides, avalanche or snow slides, and which has an essentially linear load or applied force—damping or shock absorbing characteristic, while permitting full utilization of the tensile strength of the cable in use.

Briefly, the shock absorbing device is to dampen overloads or sudden shocks, for example due to a falling rock, includes a tube formed in an open loop or ring, with overlapping ends. The cable, rope or retention wire is passed or threaded through the ring. The end portions of the tubular ring are held together by a coupling element, preferably a sleeve surrounding the tube ends.

Preferably, the loop or ring, in plan view, is a perfect circle, so that the loop will be slightly spiral—that is, the ends will overlap one next to the other; the coupling element presses the ends together and frictionally engages the tube ends against each other as well. Upon overload, the tube will be subject to forces which permit plastic deformation of the material of the tube and reduction of the diameter of the loop or ring formed by the tube.

The force-damping curve characteristic of the structure increases approximately linearly within the range of extension of the effectiveness length of the cable between its terminal ends, as the loop changes in size. Thus, a progressively increasing absorption of dynamic or kinetic energy is obtained. A sudden shock loading, for example caused by a large falling stone or rock, can be damped and accepted by deformation of the loop, through which the cable is threaded.

The course of damping with respect to elongation of the effective length of the cable between its ends can be selected within wide limits by suitable dimensioning of the tube, and the selection of the material, can thus can be predetermined. Preferably, the coupling element is in form of a sleeve, press-fitted on the tube, after the cable has been threaded therethrough, to permit for deformation of the tube and frictional engagement with the cable This results in a frictional connection between the tube and the coupling element which, only after an initial tensioning force is applied, will cause deformation of the loop or ring or winding of the tube as such.

DRAWINGS

DETAILED DESCRIPTION

Figure 3:
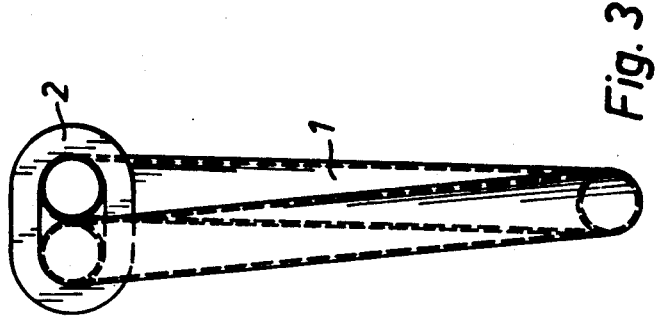
FIG. 3 is an end view, omitting the cable.

A wire rope or wire rope cable 3 is secured at its ends, in conventional manner, so that the cable 3 is in stretched condition. In accordance with the present invention, it is passed through a ring element 1. The ring element 1 has its end portions 4 overlapping in a dimension perpendicular to the major plane of the ring, so that the ring actually will form a spiral or thread-like shape, with a pitch corresponding to the diameter of the tube. The cable 3, with the loop 1 interposed, can be used, for example, to reinforce, support, or otherwise be coupled to a wire mesh, chain-link or other fencing or the like, as well known, and suitably placed to receive and block rocks, stones, or accumulated snow, avalanches and the like. The ends of the rope 3 are secured and anchored in customary manner, not shown.

Figure 1:
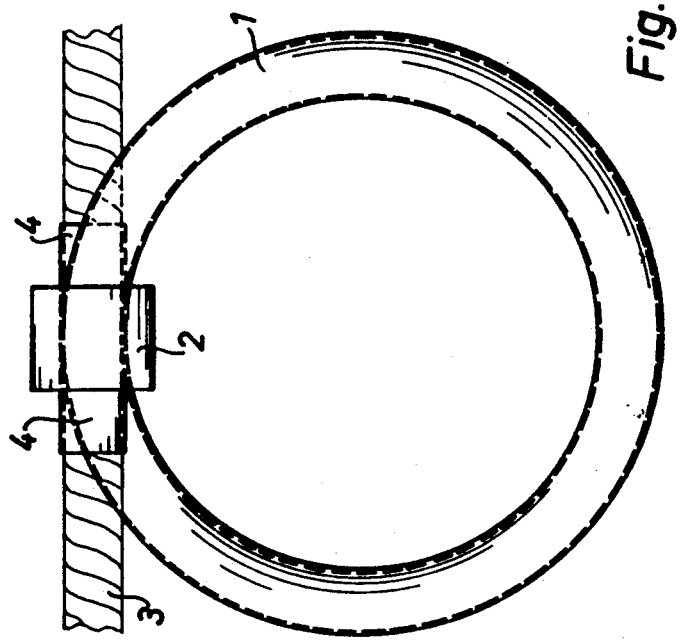
FIG. 1 is a top view of the device and a portion of a cable with which it is used.

The end regions 4 of the single-pitch or single-layer loop (FIG. 1) overlap in a plane perpendicular to the plane defined by the loop. They have parallel end portions extending tangentially to the axis of the tube 1. A compression sleeve 2, or a cable clamp, is seated on the end portions. The diameter of the cable or rope 3 is smaller than the inner diameter of the tube 1, to permit easy threading of the cable through the tube. Upon tightening of the clamp 2, the end portions 4 of the tube 1 are deformed so that they engage each other at the respective overlapping surfaces. By suitable choice of the diameter of the loop or ring of the tube 1, the wall thickness of the tube 1 and the material thereof, the characteristic curve of force vs. damping or tube deformation can be varied within wide limits, and readily matched to requirements.

Figure 2:
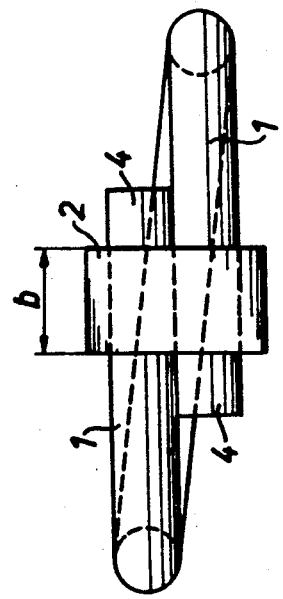
FIG. 2 is a fragmentary side view, showing the overlap of the tube ends and the clamping sleeve, and omitting the cable.

In a preferred embodiment, the following dimensions have been found suitable, for cables used in connection with retaining grids or meshes, for example to retain stones and rocks adjacent a road cut or the like:

The tube is made of welded steel tubing, which is hot-dip galvanized. Outer diameter 33.7 mm, wall thickness 3.25 mm, radius of the ring 1: about 17 cm, length of the tube—before bending—about 1.2 m. The length of the cable 3 can be, as desired, for example up to about 50 meters. The width b (FIG. 2) of the clamp 2 which, preferably, is made of aluminum alloy, is greater than the diameter of the tube 1. The two ends 4 of the tube or pipe extend in opposite direction beyond the clamp 2.

In general, various types of tubes or pipes are suitable. Preferably, the tube or pipe 1 is made of commercial welded steel tubing, or of a seamless steel tubing, having an outer diameter of between 25 to 40 mm, an inner diameter of about 20 to 30 mm, and a straight length, before bending, of between about 1 to 1.5 meters.

Assembly

First, the tube 1 is bent in ring or loop shape, slightly pitched so that the ends 4 thereof overlap, as best seen in FIG. 3. The sleeve 2 is then placed over the ends. The cable 3 is then threaded from one end 4 through the loop and out the other end 4 of the ring 1. The sleeve 2 is then tightened, either by compression by a compression tool or, if the clamp 2 is made in form of a U-clamp, by tightening the respective clamping or tightening nuts and bolts. By change of the clamping force of the clamp 2, or by change in the clamping position of the clamp 2, the acceptable force which can be absorbed, that is, the load limit of the structure, can be changed, before a deformation of the tube, and hence an increase in the effective length of the cable 3 between its end attachments will occur. The clamping sleeve 2 can so engage the two ends 4 against each other such that a frictional energy accepting coupling will obtain between the ends of the tube and the clamp 2.

Operation

Upon occurrence of an overload, sufficient to permit slippage of the end portions of the tubes 4 against each other, the diameter of the ring or loop 1 will decrease. This pulls the cable through the tube and causes the tube 1, at least at one side thereof, to slip in the clamp 2. This plastic deformation of the material of the tube or pipe 1, and the friction, causes damping of the force applied on the cable, and particularly damping of sudden shock or impact loading on the cable, and, progressively, dynamic energy is absorbed within the shock absorbing device 1-4. The structure, thus, in a simple manner, can catch falling rocks, or masses of snow, and the loading applied to the cable will be progressively accepted upon progressive increase of the effective length of the cable 3. The full strength of the cable 3 thus can be utilized.

If the length of the cable 3 exceeds about 50 meters, it is at times desirable to place more than one such device 1, 2, 4 in the cable, suitably staggered along the length thereof.

Figure 4:
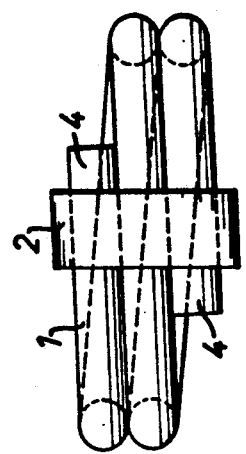
FIG. 4 is a fragmentary side view similar to FIG. 2 and illustrating another embodiment, using a plurality of layers of loops or rings or windings.

For some applications, more than one layer, or convolution, loop or winding can be used; FIG. 4 illustrates an arrangement in which two layers of loops or windings are used. The sleeve 2 extends over all the respective layers of the winding. Of course, any desired or suitable number of layers can be used, as required by particular applications.

Various changes and modifications may be made within the scope of the inventive concept.

We claim:

1. For combination with a stretched cable (3), a shock absorbing device is dampen sudden overloads and sudden shocks, comprising, in accordance with the invention, a tube (1) formed in a loop or ring having at least one turn or convolution, the end portions of which overlap, said cable (3) being passed through said tube; and a coupling element (2) surrounding said overlapping end portions (4) of the tube and retaining said overlapping end portions (4) of the tube together, and coupling the end portions (4) of said tube against each other for frictional engagement of the tube end portions against each other, to permit, upon overload applied to the cable, plastic deformation of said tube and reduction of the diameter of the loop or ring formed thereby.

2. The combination of claim 1, wherein said loop or ring has a single turn or convolution.

3. The combination of clam 2, wherein said coupling element (2) comprises a sleeve.

4. The combination of claim 1, wherein said tube is formed in multiple loops or rings, and wherein the loops or convolutions, of the loop or ring are spirally located adjacent each other.

5. The combination of claim 4, wherein said coupling element (2) comprises a sleeve.

6. The combination of claim 1, wherein said coupling element (2) comprises a sleeve.

7. The combination of claim 6, wherein said sleeve (2) is an aluminum compression sleeve.

8. The combination of claim 6, wherein said sleeve (2) has a width (b) which is wider than the diameter of said tube (1).

9. The combination of claim 1, wherein said tube (1) is a steel tube having an inner diameter of between 20 to 30 mm, optionally about 25 mm, an outer diameter of between about 25 to 40 mm, optionally about 33 mm, and a straight length of between about 1 to 2 meters, optionally about 1.2 meters.

10. The combination of claim 9, wherein said coupling element (2) comprises a sleeve.

11. The combination of claim 10, wherein said sleeve (2) has a width (b) which is wider than the diameter of said tube (1).

12. The combination of claim 9, wherein said loop or ring has a single turn or convolution.

13. The combination of claim 12, wherein said coupling element (2) comprises a sleeve.

14. The combination of claim 9, wherein said tube is formed in multiple loops or rings, and wherein the loops or convolutions, of the loop or ring are spirally located adjacent each other.

15. The combination of claim 14, wherein said coupling element (2) comprises a sleeve.

16. The combination of claim 14, wherein said coupling element comprises a sleeve (2) which has a width (b) which is wider than the diameter of said tube (1).

17. The combination of claim 1, wherein said tube (1) is a steel tube.

18. The combination of claim 1, wherein said coupling element (2) comprises an aluminum compression sleeve and said tube (1) comprises a steel tube.

* * * * *